United States Patent
Ash et al.

(10) Patent No.: US 7,051,174 B2
(45) Date of Patent: May 23, 2006

(54) METHOD, SYSTEM, AND PROGRAM FOR RESTORING DATA IN CACHE

(75) Inventors: Kevin John Ash, Tucson, AZ (US); Vernon J. Legvold, Tucson, AZ (US); Steven Robert Lowe, Tucson, AZ (US); David Frank Mannenbach, Tucson, AZ (US); Carol Santich Mellgren, Tucson, AZ (US); Kenneth Wayne Todd, Tucson, AZ (US); William Dennis Williams, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 10/255,026

(22) Filed: Sep. 24, 2002

(65) Prior Publication Data

US 2004/0059870 A1 Mar. 25, 2004

(51) Int. Cl.
*G06F 12/02* (2006.01)

(52) U.S. Cl. ........................ 711/162; 711/113; 711/114; 711/161; 711/163; 711/165; 711/166; 707/204; 707/205; 714/5; 714/6

(58) Field of Classification Search ........ 711/161–162, 711/165–166
See application file for complete search history.

(56) References Cited

U.S. PATENT DOCUMENTS

| | | | |
|---|---|---|---|
| 5,771,367 A * | 6/1998 | Beardsley et al. .......... | 711/162 |
| 5,845,104 A | 12/1998 | Rao ........................... | 711/113 |
| 5,860,090 A | 1/1999 | Clark ......................... | 711/113 |
| 5,875,315 A | 2/1999 | Narayan ..................... | 712/204 |
| 5,893,920 A | 4/1999 | Shaheen et al. ............ | 711/133 |
| 5,987,561 A | 11/1999 | Witt et al. ..................... | 711/3 |
| 6,032,227 A | 2/2000 | Shaheen et al. ............ | 711/129 |
| 6,092,149 A | 7/2000 | Hicken et al. .............. | 711/113 |
| 6,119,151 A | 9/2000 | Cantrell et al. ............. | 709/216 |
| 6,185,663 B1 | 2/2001 | Burke ......................... | 711/156 |
| 6,247,099 B1 | 6/2001 | Skazinski et al. ........... | 711/141 |
| 6,378,037 B1 | 4/2002 | Hall ........................... | 711/113 |

(Continued)

FOREIGN PATENT DOCUMENTS

WO 9639653 12/1996

*Primary Examiner*—B. James Peikari
*Assistant Examiner*—Zhuo H. Li
(74) *Attorney, Agent, or Firm*—David W. Victor; Konrad Raynes & Victor LLP

(57) ABSTRACT

Provided are a method, system, and program for maintaining data in a first cache and second cache, wherein a backup cache maintains a backup copy of data in the first cache, and wherein the first cache is used to cache a first set of data in a storage system and the second cache is used to cache a second set of data in the storage system. An unavailable state of the first cache is detected. In response to detecting the unavailable state, requests to the first set of data are blocked and at least one space in the second cache is allocated for data in the backup cache. Requests to the first set of data are allowed to proceed after the at least one space is allocated in the second cache and before the data in the backup cache is copied to the at least one allocated space in the second cache. The data from the backup cache is copied to the allocated at least one space in the second cache after the requests to the first set of data are allowed to proceed.

35 Claims, 6 Drawing Sheets

U.S. PATENT DOCUMENTS

| | | | |
|---|---|---|---|
| 6,442,698 B1 * | 8/2002 | Nizar | 713/320 |
| 6,453,404 B1 * | 9/2002 | Bereznyi et al. | 711/171 |
| 6,490,659 B1 | 12/2002 | McKean et al. | 711/141 |
| 6,513,097 B1 * | 1/2003 | Beardsley et al. | 711/113 |
| 6,567,889 B1 * | 5/2003 | DeKoning et al. | 711/114 |
| 6,785,784 B1 * | 8/2004 | Jing et al. | 711/154 |

* cited by examiner

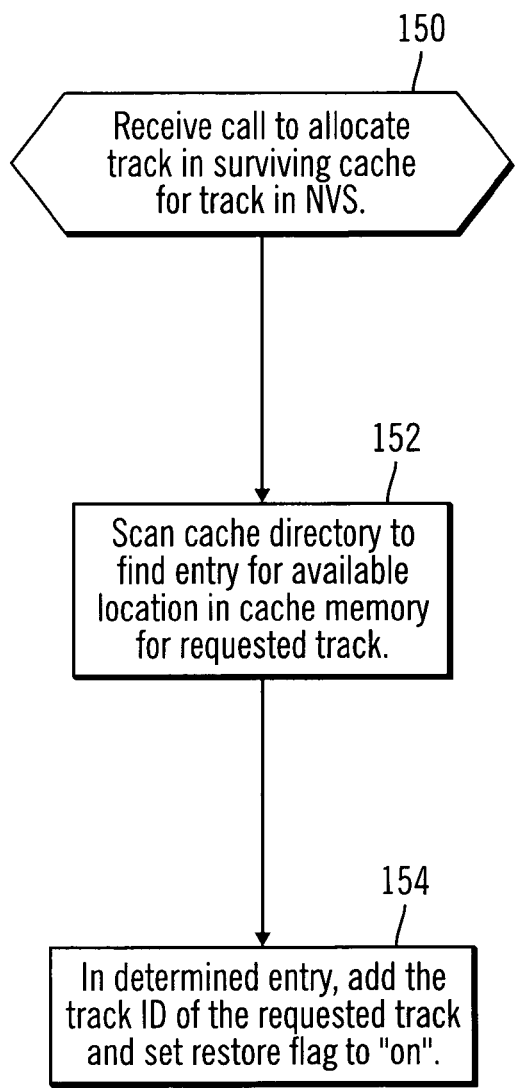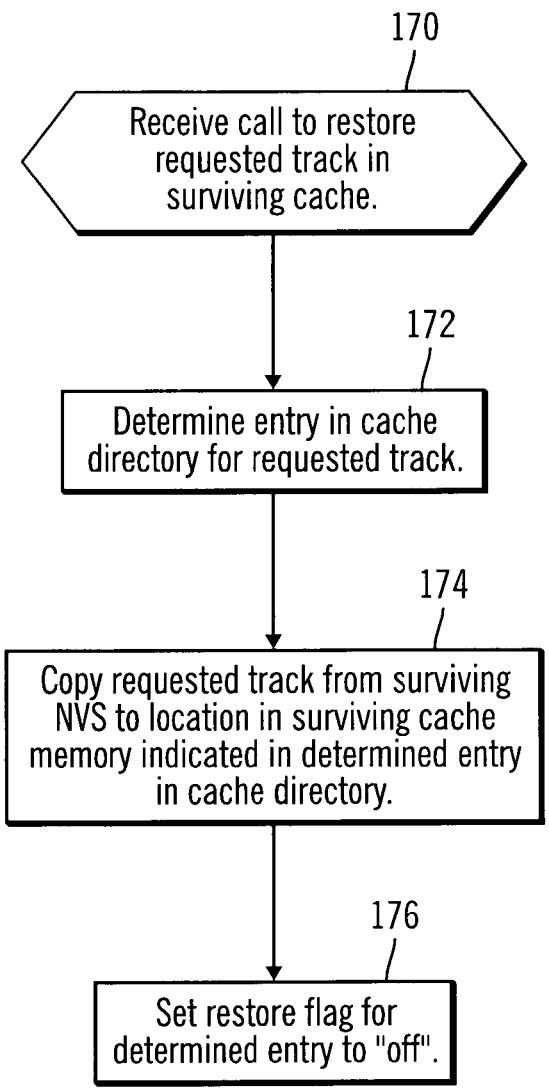

METHOD, SYSTEM, AND PROGRAM FOR RESTORING DATA IN CACHE

BACKGROUND OF THE INVENTION

1. Field of the Invention

The present invention relates to a method, system, and program for restoring data in cache.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of numerous hard disk drives connected in a loop architecture, otherwise referred to as a Direct Access Storage Device (DASD). Hosts may communicate Input/Output (I/O) requests to the storage space through the storage controller.

To maintain availability in the event of a failure, many storage controllers known in the prior art provide redundant hardware clusters. Each hardware cluster comprises a processor complex, cache, non-volatile storage (NVS), such as a battery backed-up Random Access Memory (RAM), and separate power supply to provide connection paths to the attached storage. The NVS in one cluster would backup write data from the cache in the other cluster so that if one cluster fails, the write data in the cache of the failed cluster is stored in the NVS of the surviving cluster. After one cluster fails, all Input/Output (I/O) requests would be directed toward the surviving cluster. When both clusters are available, each cluster may be assigned to handle I/O requests for specific logical storage devices configured within the physical storage devices.

In the event of a failure of one of the clusters, a failover will occur to have the surviving cluster handle all I/O requests previously handled by the failed cluster so that access to the storage system managed by the storage controller remains available. As part of the failover process, the surviving cluster remains online and all the cached data for the failed cluster, i.e., the write data to the logical devices assigned to the failed cluster that was backed up in the NVS of the surviving cluster, is copied (also known as restored) from the NVS in the surviving cluster to the cache of the surviving cluster. Thus, after failover, the cache and NVS in the surviving cluster buffer writes that were previously directed to the failed cluster. During this restore/failover process, host I/O requests directed to logical devices previously assigned to the failed cluster are delayed until all writes to such logical devices in the NVS in the surviving cluster are restored/copied to the cache in the surviving cluster.

This restore process can take thirty seconds or more. Such a delay is often deemed unacceptable for storage controllers used in critical data environments where high availability is demanded. For instance, the systems used by large banks or financial institutions cannot tolerate delayed access to data for periods of several seconds, let alone thirty seconds or more.

For these reasons, there is a need in the art for improved techniques for handling data recovery in a manner that minimizes the time during which I/O requests to the storage are delayed.

SUMMARY OF THE DESCRIBED IMPLEMENTATIONS

Provided are a method, system, and program for maintaining data in a first cache and second cache, wherein a backup cache maintains a backup copy of data in the first cache, and wherein the first cache is used to cache a first set of data in a storage system and the second cache is used to cache a second set of data in the storage system. An unavailable state of the first cache is detected. In response to detecting the unavailable state, requests to the first set of data are blocked and at least one space in the second cache is allocated for data in the backup cache. Requests to the first set of data are allowed to proceed after the at least one space is allocated in the second cache and before the data in the backup cache is copied to the at least one allocated space in the second cache. The data from the backup cache is copied to the allocated at least one space in the second cache after the requests to the first set of data are allowed to proceed.

In further implementations, the data copied from the backup cache to the allocated at least one space in the second cache may comprise data that was stored in the first cache when the first cache failed.

Still further, a request for data for which space is allocated in the second cache may be received after requests to the first set of data are allowed to proceed. A determination is then made as to whether the requested data is in the allocated space in the second cache, wherein the data is copied from the backup cache to the allocated space in the second cache when the data is determined to not be in the allocated space.

In yet further implementations, after allowing requests to the first set of data to proceed, a determination is made of allocated spaces in the second cache that do not have the data for which the space is allocated, wherein the data is copied from the backup cache to the determined allocated spaces in the second cache.

Described implementations provide techniques for restoring data from a backup cache to a cache in a manner that minimizes the time during which requests for data are not allowed to proceed.

BRIEF DESCRIPTION OF THE DRAWINGS

Referring now to the drawings in which like reference numbers represent corresponding parts throughout:

FIGS. 4–7 illustrate logic to restore data in a cache as a result of a failover in accordance with implementations of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
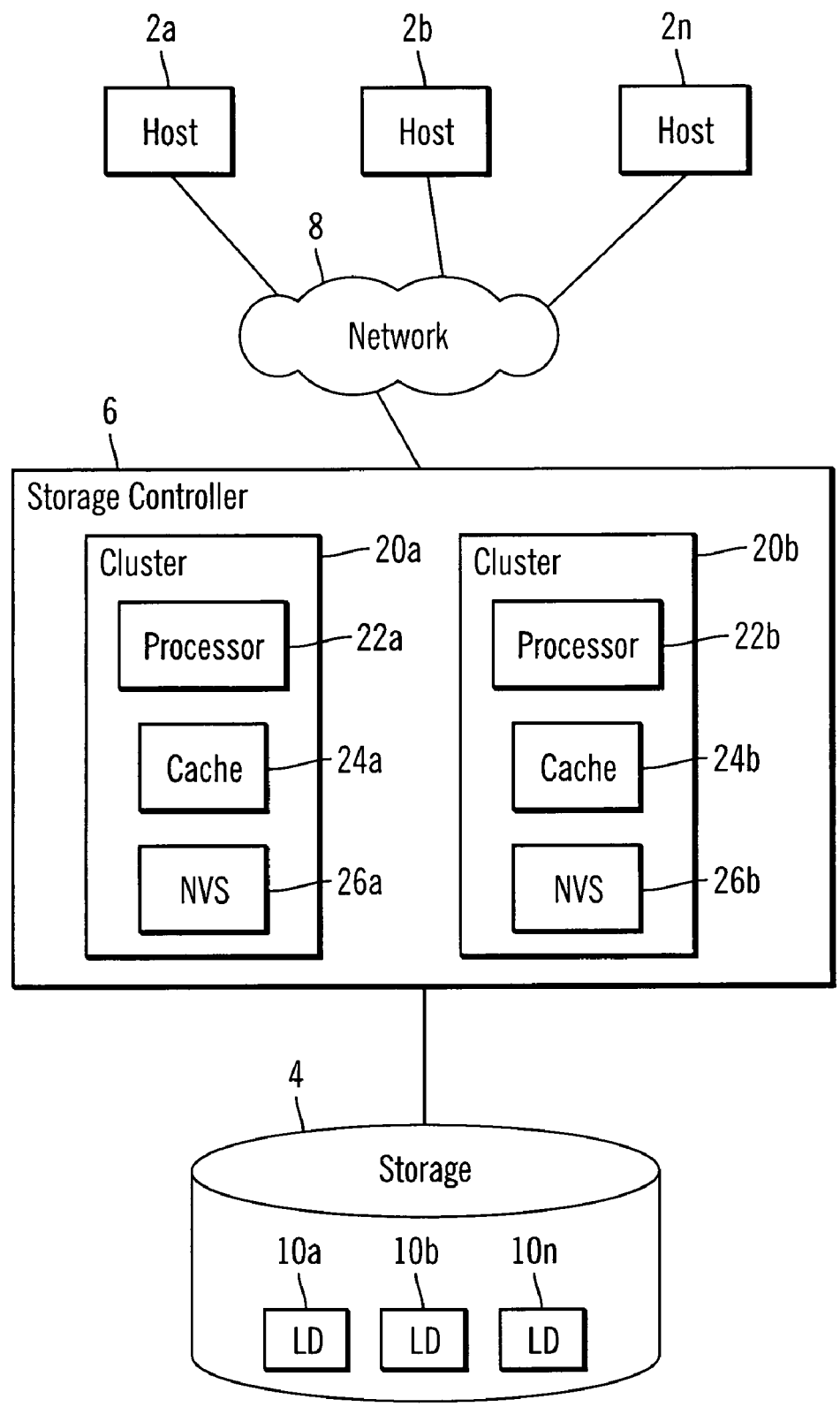
FIG. 1 illustrates a computing environment in which aspects of the invention are implemented.

FIG. 1 illustrates a computing architecture in which aspects of the invention are implemented. One or more hosts 2a, 2b . . . 2n are in data communication with a storage system 4, such as a DASD or any other storage system known in the art, via a storage controller 6. The host 2 may be any computing device known in the art, such as a server, mainframe, workstation, personal computer, hand held computer, laptop, telephony device, network appliance, etc. The storage controller 6 and host system(s) 2 communicate via a network 8, which may comprise a Storage Area Network (SAN), Local Area Network (LAN), Intranet, the Internet, Wide Area Network (WAN), etc. The storage system 4 may be comprised of hard disk drives, tape cartridge libraries, optical disks, or any suitable non-volatile storage medium known in the art. The storage system 4 may be arranged as an array of storage devices, such as a Just a Bunch of Disks (JBOD), DASD, Redundant Array of Independent Disks (RAID) array, virtualization device, etc. The storage controller 6 may comprise any storage controller or server known in the art, such as the IBM Enterprise Storage Server (ESS) or any other storage controller known in the art.** In certain implementations, the storage space in the storage controller 4 is configured as a plurality of logical devices (LD) 10a, 10b . . . 10n.

The storage controller 6 includes two separate clusters 20a, 20b of hardware components to provide redundancy for improved availability. Each cluster 20a, 20b may be maintained on a separate power boundary, and includes a processor complex 22a, 22b, a cache 24a, 24b, and a non-volatile storage unit (NVS) 26a, 26b. The NVS 26a, 26b may comprise a battery backed-up RAM or any other type of non-volatile or volatile backup cache used to backup data in cache. The hosts 2a, 2b . . . 2n would submit application I/O requests directed to a target logical device (LD) 10a, 10b . . . 10n, including write data, to the cluster 20a, 20b to which the target logical device (LD) 10a, 10b . . . 10n is assigned. The NVS 26a, 26b in one cluster 20a, 20b is used to backup write data in the cache 24b, 24a in the other cluster 20b, 20a, e.g., NVS 26a backs up write data in cache 24b.

Figure 2:
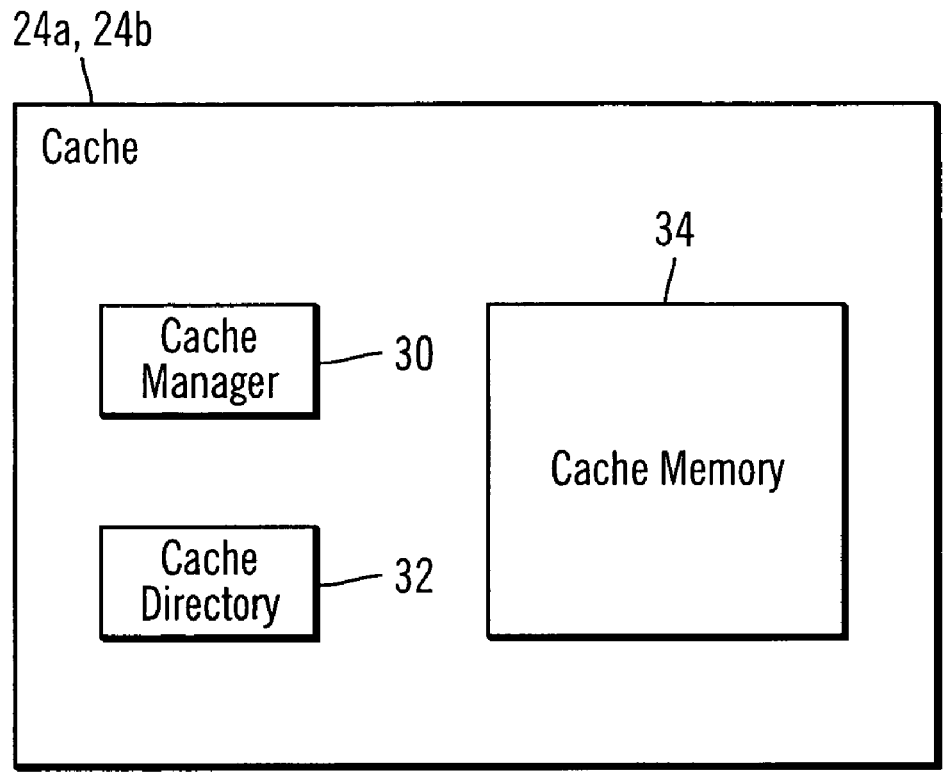
FIG. 2 illustrates an architecture of a cache utilized with implementations of the invention.
Figure 3:
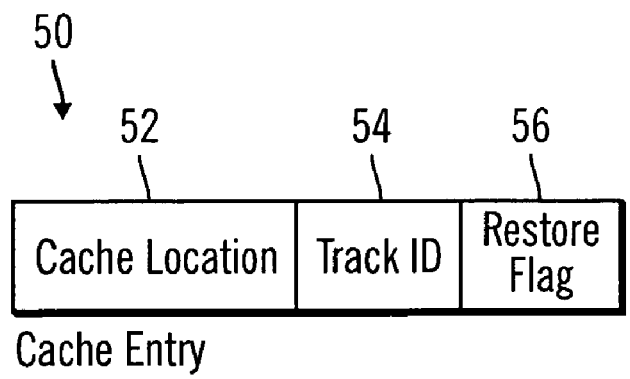
FIG. 3 illustrates information in a cache directory in accordance with implementations of the invention.

FIG. 2 illustrates further details of the components of the caches 24a, 24b. The caches 24a, 24b are comprised of a cache manager 30, which may comprise hardware or software logic, that manages cache operations and a cache directory 32 that includes information on each track or data unit in the cache memory 34. In certain implementations, the cache directory 32 includes an entry for each track maintained in the cache memory 34. FIG. 3 illustrates the information maintained in each entry 50 in the cache directory 32. Each cache directory entry 50 includes the cache memory location 52 in which the track is stored, the target track identifier (ID) 54, and a restore flag 56. The track ID 52 would identify the track and may include the location of the track in the physical storage device in the storage 4, e.g., cylinder, head, drive, etc. The cache directory entries 50 may include additional information known in the art, such as destage and stage flags, indicating whether to destage or stage the track between the cache and storage.

In describing the logic of FIGS. 4–7, cluster 20a will be described as the failed cluster and cluster 20b as the surviving cluster. Notwithstanding, the failover logic described in FIGS. 4–7 is capable of being executed by both processor complexes 22a, 22b in both clusters 20a, 20b in the storage controller 6 so that failover can occur to both the clusters 20a, 20b in the event the other cluster 20b, 20a fails.

Figure 4:
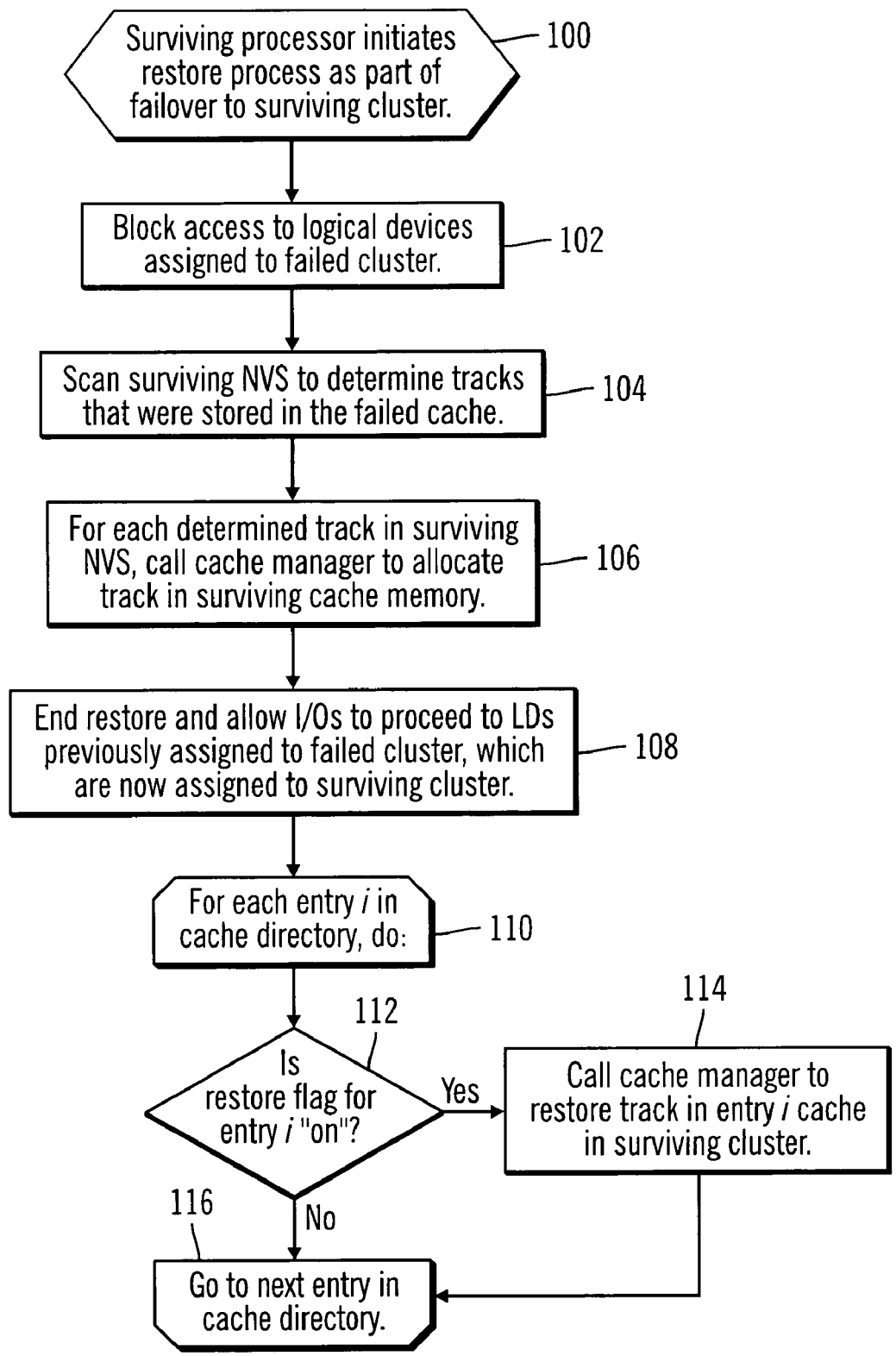

FIG. 4 illustrates logic executed by the processor complexes 22a, 22b in the surviving cluster 20a, 20b during a failover to initiate (at block 100) a cache restore process. Upon initiating failover in the event of a failure of cluster 20a, the surviving processor complex 22b in the surviving cluster 20b blocks host 2a, 2b . . . 2n I/O requests directed to logical devices 10a, 10b . . . 10n assigned to the failed cluster 20a. Access may be blocked by returning failure to the I/O requests or queuing the I/O request to delay processing until the restore operation completes. The surviving processor complex 22b then scans (at block 104) the surviving NVS 26b to determine the tracks in the surviving NVS 26b, which includes tracks stored in the failed cache 20a when the cluster 20a failed. As mentioned, the surviving NVS 26b would maintain a backup copy of the data that was in the failed cache 24a. For each determined track, the surviving processor complex 22b then calls (at block 106) the cache manager 30 for the surviving cache 24b in the surviving cluster 20b to allocate an entry in the cache memory 34 for the determined track. With this call, the cache manager 30 creates an entry in the cache directory 32 for the determined track without actually copying the track over from the surviving NVS 26b to the surviving cache 24b. The surviving processor complex 22b then ends the restore and allows (at block 108) the hosts 2a, 2b . . . 2n to issue I/O requests to the logical devices (LDs) 10a, 10b . . . 10n previously assigned to the failed cluster 20a, where such logical devices 10a, 10b . . . 10n are now reassigned to the surviving cluster 20b.

With the logic of FIG. 4, hosts 2a, 2b . . . 2n are permitted access to the logical device 10a, 10b . . . 10n previously assigned to the failed cluster 20a immediately after space in the surviving cache 24b is allocated for the tracks in the surviving NVS 26b, which stores the tracks that were in the failed cache 24a when the failure occurred. This cache allocation process takes substantially less time than the substantially longer time needed to copy/restore tracks from the failed cache 24b in the surviving NVS 26b to the surviving cache 24b. In fact, the restore process described herein can take one second or less. In this way, the hosts 2a, 2b . . . 2n are allowed access to the logical devices 10a, 10b . . . 10n previously assigned to the failed cache 24a relatively quickly, and without having to wait for the tracks to be copied from the surviving NVS 26b to the surviving cache 24b. Further, after failover, the surviving cache 24b and NVS 26b are used to buffer writes for all the logical devices 10a, 10b . . . 10n previously handled by both clusters 20a, 20b.

After the space is allocated in the surviving cache for the tracks to restore at block 108 and host I/O requests directed to the logical devices 10a, 10b . . . 10n previously assigned to the failed cluster 20a are allowed to proceed, the surviving processor complex 22b then performs a loop at blocks 110 through 116 for each entry, i.e., track, in the cache directory 32. If the restore flag 56 (FIG. 3) for entry i is set to "on", then the surviving processor complex 22b calls (at block 114) the cache manager 30 for the surviving cache 24b to restore the track at entry i in the surviving cache memory 34 from the surviving NVS 26b. If the restore flag 56 is not "on" or after calling the cache manager 30 at block 114, control proceeds (at block 116) to consider the next entry in the cache directory 32. In this way, a background operation is performed to restore the tracks from the surviving NVS to the surviving cache during normal I/O operations. At the completion of the logic at blocks 110–116, all the tracks from the surviving NVS have been copied back into the surviving cache. In certain implementations, the background restore task executed at blocks 110–116 may be performed at a low task priority to minimize interference with higher priority requests to the recovered cache, such as host I/O requests.

FIG. 5 illustrates logic implemented in the cache manager 30 of the surviving cache 24b to allocate space in the surviving cache 24b for a requested track upon receiving (at block 150) a call from the surviving processor complex 20b to allocate a track in the surviving cache 24b at block 106 in FIG. 4. In response to the call, the cache manager 30 scans (at block 152) the cache directory 32 to find an entry for an available location in the surviving cache memory 34 to allocate to the requested track. After locating an available entry in the cache directory 32, the cache manager 30 of the surviving cache 24b would add (at block 154) the track ID 54 (FIG. 3) of the requested track to the located cache entry 50. The restore flag 56 for the located entry would also be set to "on", indicating that the requested track is not in cache but that space in the surviving cache 24b is allocated for the requested track for use when the track is restored from the surviving NVS 26b.

FIG. 6 illustrates logic implemented in the cache manager 30 to restore a track in response to call from the surviving processor complex 22b at block 112 in FIG. 4. Upon receiving (at block 170) the call to restore a requested track, the cache manager 30 of the surviving cache 24b determines (at block 172) the entry in the cache directory 32 allocated to the requested track to restore. The cache manager 30 then causes (at block 174) the copying of the requested track from the surviving NVS 26b to the location in the surviving cache memory 34 indicated at the cache location 52 in the determined entry 50. The restore flag 56 is then set (at block 176) to "off" indicating that the requested track, which was previously stored in the failed cache 24a, is now restored into the allocated location in the surviving cache 24b.

Figure 7:
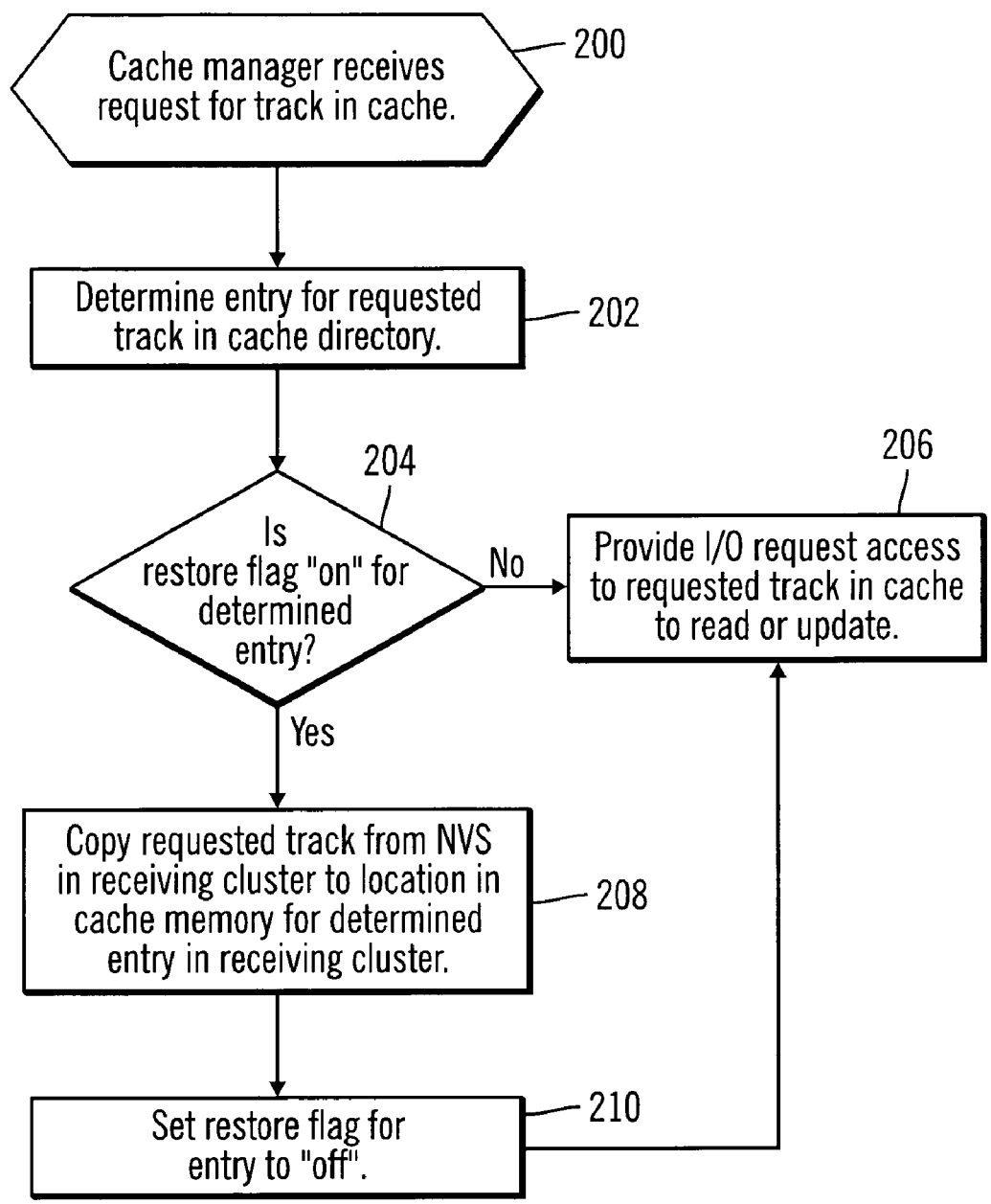

FIG. 7 illustrates logic implemented in the cache manager 30 for the surviving cache 24b to process requests for tracks in the cache memory 34. In response to receiving (at block 200) a request for a track in the surviving cache 24b, the cache manager 30 determines (at block 202) the entry 50 (FIG. 3) for the requested track in the cache directory 32. If (at block 204) the restore flag 56 for the determined entry is not "on", indicating that the track is in the cache memory 34 and does not need to be restored from the surviving NVS 26b, then the cache manager 30 provides (at block 206) the I/O request access to the track in cache 24b to read or update. However, if the restore flag 56 is "on", then the cache manger 30 causes (at block 208) the copying of the requested track in the surviving NVS 26b to the cache location 52 in the surviving cache 24b indicated in the determined entry 50. The restore flag 56 in the determined entry 50 is then set (at block 210) "off" indicating that the track has been restored. After restoring the track from the surviving NVS 26b to the surviving cache 24b, control proceeds to block 206 to provide the I/O request access to the requested track. In this way, a track is restored in cache either through the background recovery process at blocks 108 through in FIG. 4 or restored in response to a host request for access to a track allocated in cache but not yet restored according to the logic of FIG. 7.

With the described implementations, the tracks in the surviving NVS do not need to be restored to the surviving cache before hosts are allowed access to the logical devices previously assigned to the failed cluster. Instead, I/O requests are only delayed for a minimal period of time, e.g., less than second, while space is allocated in the surviving cache for tracks in the surviving NVS, which at the time of failure includes those tracks that were stored in the failed cache. The described implementations provide a failover cache restore process that ensures that hosts have access to the most recent data through the cache and at the same time avoids the cost of lengthy cache restore operations that are unacceptable for certain users that require high availability for critical data.

ADDITIONAL IMPLEMENTATION DETAILS

The described techniques for restoring data in cache may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, certain operations were described as performed by the processor complexes 22a, 22b and cache manager 32. In alternative implementations, certain operations described as performed by the processor complexes may be performed by the cache manager and vice versa.

The described implementations for cache restore were described for use with systems deployed in a critical data environment where high availability is paramount. However, those skilled in the art will appreciate that the cache recovery operations described herein may apply to storage systems used for non-critical data where high availability is not absolutely necessary.

In the described implementations, the restore process was described as occurring in the context of a cluster failure and subsequent failover. In alternative implementations, the described restore process may be used for events other than a failover. For instance, if the administrator wants to take one cluster offline for repair or for any other reason, then the described restore process may be used to quickly transfer all I/O requests to one cluster that will remain online. Still further, the failure that causes the failover may comprise a failure of the entire cluster or a part of the cluster, such as any one of the processor complex, cache or storage unit.

In the described implementations, dual clusters were provided and cache data was recovered from a backup NVS in another cluster. In alternative implementations, the storage system may have only one cluster and the cache data may be restored from that single NVS in the single cluster. In still further implementations, there may be more than two clusters as shown and cache data may be restored from an NVS in the same cluster as the cache or in any of the other clusters. Further, the NVS may comprise any non-volatile storage that is used to backup data in the cache, such as write data.

The illustrated logic of FIGS. 4–7 show certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

The variable n is used to denote any integer variable for certain of the described elements and may indicate a same or different integer value when used in different instances.

Figure 8:
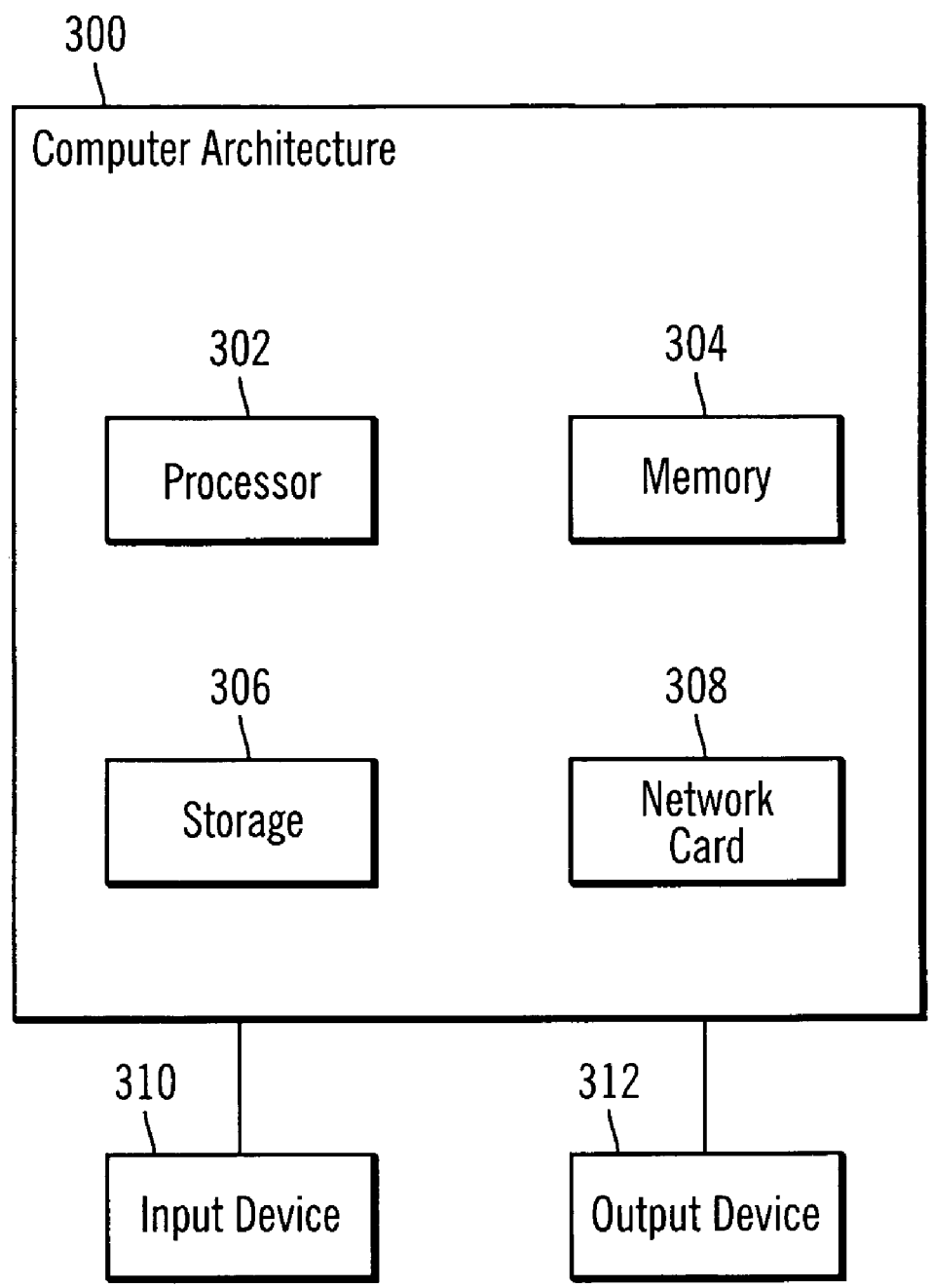
FIG. 8 illustrates an architecture of computing components in the network environment, such as the hosts and storage controller, and any other computing devices.

FIG. 8 illustrates one implementation of a computer architecture 300 of the network components, such as the hosts and storage controller shown in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for maintaining data in a first cache and second cache, wherein a backup cache maintains a backup copy of data in the first cache, and wherein the first cache is used to cache a first set of data in a storage system and the second cache is used to cache a second set of data in the storage system, comprising:

detecting an unavailable state of the first cache;

in response to detecting the unavailable state, blocking requests to the first set of data and allocating at least one space in the second cache for data in the backup cache;

allowing requests to the first set of data to proceed after the at least one space is allocated in the second cache and before the data in the backup cache is copied to the at least one allocated space in the second cache; and copying the data from the backup cache to the allocated at least one space in the second cache after the requests to the first set of data are allowed to proceed.

2. The method of claim 1, wherein the data copied from the backup cache to the allocated at least one space in the second cache is data that was stored in the first cache when the first cache failed.

3. The method of claim 1, wherein the data for which space is allocated comprises write data to the storage system.

4. The method of claim 1, further comprising:

receiving a request for data for which space is allocated in the second cache after requests to the first set of data are allowed to proceed; and determining whether the requested data is in the allocated space in the second cache, wherein the data is copied from the backup cache to the allocated space in the second cache when the data is determined to not be in the allocated space.

5. The method of claim 4, further comprising:

providing access to the requested data after the requested data is copied from the backup cache to the allocated space in the second cache.

6. The method of claim 1, further comprising:

after allowing requests to the first set of data to proceed, determining allocated spaces in the second cache that do not have the data for which the space is allocated, wherein the data is copied from the backup cache to the determined allocated spaces in the second cache.

7. The method of claim 6, wherein the determination of the allocated spaces is performed as a background operation to determine all allocated spaces in the second cache that do not have the data for which the space is allocated.

8. The method of claim 1, further comprising:

maintaining a cache directory including information for each allocated space in the second cache; and after allocating the space in the second cache, indicating a restore state in the information for each allocated space in the second cache when the data is in the backup cache and not in the allocated space, wherein data is copied from the backup cache to the allocated space in the second cache for those allocated spaces having information indicating the restore state.

9. The method of claim 1, wherein the first cache is in a first cluster additionally including a first processor and first backup cache, and wherein the backup cache comprises a second backup cache in a second cluster additionally including a second processor and the second cache, wherein the first backup cache maintains a copy of data in the second cache, and wherein the recovery operations of blocking access to requests, allocating space, allowing access requests to proceed, and copying the data from the backup cache to the allocated space are performed by the first and second processors.

10. The method of claim 1, wherein the first and second sets of data comprise different sets of logical devices in the storage system.

11. The method of claim 1, wherein the detected unavailable state of the first cache results from a failure of the first cache.

12. The method of claim 1, wherein the second cache is used to cache data to the first and second sets of data in the storage system after the requests to the first set of data are allowed to proceed.

13. A system for maintaining data in communication with a storage system, comprising:
- a first cache;
- a second cache;
- a backup cache maintaining a backup copy of data in the first cache, wherein the first cache is used to cache a first set of data in the storage system and the second cache is used to cache a second set of data in the storage system;
- means for detecting an unavailable state of the first cache;
- means for blocking, in response to detecting the unavailable state, requests to the first set of data and allocating at least one space in the second cache for data in the backup cache;
- means for allowing requests to the first set of data to proceed after the at least one space is allocated in the second cache and before the data in the backup cache is copied to the at least one allocated space in the second cache; and
- means for copying the data from the backup cache to the allocated at least one space in the second cache after the requests to the first set of data are allowed to proceed.

14. The system of claim 13, wherein the data copied from the backup cache to the allocated at least one space in the second cache is data that was stored in the first cache when the first cache failed.

15. The system of claim 13, wherein the data for which space is allocated comprises write data to the storage system.

16. The system of claim 13, further comprising:
- means for receiving a request for data for which space is allocated in the second cache after requests to the first set of data are allowed to proceed; and
- means for determining whether the requested data is in the allocated space in the second cache, wherein the data is copied from the backup cache to the allocated space in the second cache when the data is determined to not be in the allocated space.

17. The system of claim 16, further comprising:
- means for providing access to the requested data after the requested data is copied from the backup cache to the allocated space in the second cache.

18. The system of claim 13, further comprising:
- means for determining, after allowing requests to the first set of data to proceed, allocated spaces in the second cache that do not have the data for which the space is allocated, wherein the data is copied from the backup cache to the determined allocated spaces in the second cache.

19. The system of claim 18, wherein the means for determining the allocated spaces is performed as a background operation to determine all allocated spaces in the second cache that do not have the data for which the space is allocated.

20. The system of claim 13, further comprising:
- a cache directory including information for each allocated space in the second cache; and
- means for indicating, after allocating the space in the second cache, a restore state in the information for each allocated space in the second cache when the data is in the backup cache and not in the allocated space, wherein data is copied from the backup cache to the allocated space in the second cache for those allocated spaces having information indicating the restore state.

21. The system of claim 13, further comprising:
- a first cluster including a first processor, a first backup cache, and the first cache; and
- a second cluster including a second processor, a second backup cache, and wherein the backup cache comprises a second backup cache in the second cluster, wherein the first backup cache maintains a copy of data in the second cache, and wherein the recovery operations of blocking access to requests, allocating space, allowing access requests to proceed, and copying the data from the backup cache to the allocated space are performed by the first and second processors.

22. The system of claim 13, wherein the first and second sets of data comprise different sets of logical devices in the storage system.

23. The system of claim 13, wherein the backup cache comprises a non-volatile storage unit.

24. An article of manufacture for maintaining data in a first cache and second cache, wherein a backup cache maintains a backup copy of data in the first cache, wherein the first cache is used to cache a first set of data in a storage system and the second cache is used to cache a second set of data in the storage system, and wherein the article of manufacture causes operations to be performed, the operations comprising:
- detecting an unavailable state of the first cache;
- in response to detecting the unavailable state, blocking requests to the first set of data and allocating at least one space in the second cache for data in the backup cache;
- allowing requests to the first set of data to proceed after the at least one space is allocated in the second cache and before the data in the backup cache is copied to the at least one allocated space in the second cache; and
- copying the data from the backup cache to the allocated at least one space in the second cache after the requests to the first set of data are allowed to proceed.

25. The article of manufacture of claim 24, wherein the data copied from the backup cache to the allocated at least one space in the second cache is data that was stored in the first cache when the first cache failed.

26. The article of manufacture of claim 24, wherein the data for which space is allocated comprises write data to the storage system.

27. The article of manufacture of claim 24, further comprising:
- receiving a request for data for which space is allocated in the second cache after requests to the first set of data are allowed to proceed; and
- determining whether the requested data is in the allocated space in the second cache, wherein the data is copied from the backup cache to the allocated space in the second cache when the data is determined to not be in the allocated space.

28. The article of manufacture of claim 27, further comprising:
- providing access to the requested data after the requested data is copied from the backup cache to the allocated space in the second cache.

29. The article of manufacture of claim 24, further comprising:
- after allowing requests to the first set of data to proceed, determining allocated spaces in the second cache that do not have the data for which the space is allocated, wherein the data is copied from the backup cache to the determined allocated spaces in the second cache.

30. The article of manufacture of claim 29, wherein the determination of the allocated spaces is performed as a background operation to determine all allocated spaces in the second cache that do not have the data for which the space is allocated.

31. The article of manufacture of claim 24, further comprising:

maintaining a cache directory including information for each allocated space in the second cache; and after allocating the space in the second cache, indicating a restore state in the information for each allocated space in the second cache when the data is in the backup cache and not in the allocated space, wherein data is copied from the backup cache to the allocated space in the second cache for those allocated spaces having information indicating the restore state.

32. The article of manufacture of claim 24, wherein the first cache is in a first cluster additionally including a first processor and first backup cache, and wherein the backup cache comprises a second backup cache in a second cluster additionally including a second processor and the second cache, wherein the first backup cache maintains a copy of data in the second cache, and wherein the recovery operations of blocking access to requests, allocating space, allowing access requests to proceed, and copying the data from the backup cache to the allocated space are performed by the first and second processors.

33. The article of manufacture of claim 24, wherein the first and second sets of data comprise different sets of logical devices in the storage system.

34. The article of manufacture of claim 24, wherein the detected unavailable state of the first cache results from a failure of the first cache.

35. The article of manufacture of claim 24, wherein the second cache is used to cache data to the first and second sets of data in the storage system after the requests to the first set of data are allowed to proceed.

* * * * *